United States Patent
Weens et al.

(10) Patent No.: US 9,780,996 B2
(45) Date of Patent: Oct. 3, 2017

(54) METHOD OF COMMUNICATION BY MESSAGES AND ASSOCIATED DEVICE

(75) Inventors: Franck Weens, Meudon (FR); Lars Kiessling, Chatillon (FR); Joselyn Barranco, Issy les Moulineaux (FR)

(73) Assignee: Orange, Paris (FR)

( * ) Notice: Subject to any disclaimer, the term of this patent is extended or adjusted under 35 U.S.C. 154(b) by 36 days.

(21) Appl. No.: 12/375,752

(22) PCT Filed: Aug. 6, 2007

(86) PCT No.: PCT/FR2007/051790
§ 371 (c)(1),
(2), (4) Date: Jan. 30, 2009

(87) PCT Pub. No.: WO2008/017788
PCT Pub. Date: Feb. 14, 2008

(65) Prior Publication Data
US 2010/0005143 A1    Jan. 7, 2010

(30) Foreign Application Priority Data
Aug. 8, 2006   (FR) ..................... 06 53321

(51) Int. Cl.
*G06F 15/16* (2006.01)
*H04L 12/24* (2006.01)
*H04L 29/08* (2006.01)
*H04L 29/06* (2006.01)

(52) U.S. Cl.
CPC .......... *H04L 41/0803* (2013.01); *H04L 67/06* (2013.01); *H04L 67/125* (2013.01); *H04L 67/30* (2013.01); *H04L 69/18* (2013.01); *H04L 69/24* (2013.01)

(58) Field of Classification Search
CPC ..................... H04L 67/141; H04L 41/0803
USPC ......................... 709/230, 204, 228
See application file for complete search history.

(56) References Cited

U.S. PATENT DOCUMENTS

| | | | |
|---|---|---|---|
| 6,170,061 B1 * | 1/2001 | Beser | 726/3 |
| 6,775,276 B1 | 8/2004 | Beser | |
| 2002/0087701 A1 * | 7/2002 | Siikaniemi | 709/227 |
| 2002/0180614 A1 * | 12/2002 | Gonzalez et al. | 340/870.01 |

(Continued)

FOREIGN PATENT DOCUMENTS

| | | |
|---|---|---|
| WO | WO 01/61933 A1 | 8/2001 |
| WO | WO 0161933 A1 * | 8/2001 |

*Primary Examiner* — Liangche A Wang
*Assistant Examiner* — Sherman Lin
(74) *Attorney, Agent, or Firm* — Drinker Biddle & Reath LLP

(57) ABSTRACT

A method of communication between a sending device and a recipient device, comprising
  a step (210; 310; 410) for transmission, from the sending device to the recipient device, of a first message comprising a first service identifier relating to a first data transport service and a first data set corresponding to a configuration of said first data transport service,
  a step (220; 320; 420) for the sending, from the sending device to the recipient device, of a second message comprising a first protocol identifier relating to a first data transmission protocol and a second data set corresponding to a configuration of said first data transmission protocol,
  the first message and the second message being sent separately.

11 Claims, 3 Drawing Sheets

(56) References Cited

U.S. PATENT DOCUMENTS

| | | | |
|---|---|---|---|
| 2003/0036396 A1* | 2/2003 | Back | H04L 29/06 455/466 |
| 2003/0101243 A1* | 5/2003 | Donahue et al. | 709/220 |
| 2003/0145067 A1 | 7/2003 | Cover et al. | |
| 2004/0128369 A1* | 7/2004 | Moreau et al. | 709/220 |
| 2004/0218609 A1* | 11/2004 | Foster et al. | 370/401 |
| 2005/0221834 A1* | 10/2005 | Kangas et al. | 455/452.1 |
| 2006/0133409 A1 | 6/2006 | Prakash et al. | |
| 2008/0233922 A1* | 9/2008 | Lesrel | 455/412.1 |

* cited by examiner

METHOD OF COMMUNICATION BY MESSAGES AND ASSOCIATED DEVICE

CROSS-REFERENCE TO RELATED APPLICATIONS

This application is the U.S. national phase of the International Patent Application No. PCT/FR2007/051790 filed Aug. 06, 2007, which claims the benefit of French Application No. 06 53321 filed Aug. 08, 2006, the entire content of which is incorporated herein by reference.

FIELD OF THE INVENTION

The invention relates to the field of telecommunications, and more particularly, a method of communication between a sending device and a recipient device, and a device, on the sending side or the recipient side, implementing such a method.

BACKROUND OF THE INVENTION

In the particular field of machine-to-machine communications, also called M2M, there are various ways for a machine or a piece of equipment, provided with an embedded application, to communicate with a remote device, for example a remote device implementing an application to manage this piece of equipment.

The known communication methods use a method of communication by message interchanges between this piece of equipment and an associated modem. These messages are usually in the form of AT commands, making it possible to send to the modem any kind of data and/or parameters for configuring the connection to the communication network, in order, for example, to have data transmitted via this network to a remote server or device.

The inventors have observed that the method of communication between a piece of equipment and its associated modem varies widely from one modem to another when it concerns non-standardized messages. The result is that the embedded application in the piece of equipment must each time be developed specifically for a target modem.

Furthermore, the connection to the network and the data interchange via the network can be performed in different ways, for example by sending a short message of SMS (Short Message Service) type, by setting up a GPRS connection for a data transfer conforming to the FTP (File Transfer Protocol) or HTTP (Hypertext Transfer Protocol) protocol, etc. Thus, the manner in which the embedded application controls the modem is therefore likely to vary from one modem to another. This results in significant development costs.

The inventors have therefore identified the need to have a simple and generic method of communication, suited to the setting up of a communication between a piece of equipment and a modem and applicable to any type of modem. The invention has none of the drawbacks described hereinabove.

SUMMARY OF THE INVENTION

The subject of the invention, according to a first aspect, is a method of communication between a sending device and a recipient device, comprising
  a step for transmission, from the sending device to the recipient device, of a first message comprising:
    a first service identifier relating to a first data transport service,
    a first data set corresponding to a configuration of said first data transport service,
  a step for transmission, from the sending device to the recipient device, of a second message comprising:
    a first protocol identifier relating to a first data transmission protocol,
    a second data set corresponding to a configuration of said first data transmission protocol,
  the first message and the second message being sent separately.

The invention is based on an observation made by the inventors according to which it is possible to separate the configuration of the data transport service from that of the data transmission protocol, and in particular, to send two distinct configuration messages separately and independently.

This divides the phase of configuration of a communication link to be set up into a succession of simple steps. Furthermore, this makes it possible to consider using several protocols with one and the same data transport service, or, conversely, several data transport services with one and the same protocol, while sending the protocol or service configuration data just once.

Preferably, the format of the first message is independent of the data transport service identified by the first service identifier. The sending of service configuration data is thus simplified by the use of a message format that is common to all the services.

Similarly, the format of the second message is preferably independent of the data transmission protocol identified by the first protocol identifier. The sending of protocol configuration data is then simplified by the use of a message format that is common to all the protocols.

Consequently, whatever the target protocol and whatever the target transport service, a sending device can communicate with any recipient device, from the moment that this recipient device knows the message formats used. The result of this is a possible standardization of the recipient device and of the method of communication with the recipient device.

According to one embodiment, the first message comprises a first data set identifier, the method comprising a step for storage, by the recipient device, in a first memory, of said first data set in association with said first service identifier and with said first data set identifier.

In a variant of this first embodiment, the second message comprises a second data set identifier, the method comprising a step for storage, by the recipient device, in a second memory, of said second data set in association with said first protocol identifier and with said second data set identifier.

The use of identifier relating to a configuration data set stored in memory makes it possible to reuse this set on a subsequent action to be executed, and without having to send each time the data set concerned. The result of this is a simplification of the sending of messages and a reduction of the quantity of data to be transmitted. Furthermore, because of the segregation between the configuration of the data transport service and that of the data transmission protocol, when envisaging the use of several protocols with one and the same data transport service or, conversely, several data transport services with one and the same protocol, all that is needed is to send the configuration data relating to this protocol or to this service just once.

According to a particular embodiment, the method comprises a step for transmission, from the sending device to the recipient device, in order to have a first action executed relating to a second data transport service, of a third message comprising a second service identifier relating to said second data transport service and a first action identifier relating to said first action, and a step for execution by the recipient device of said first action.

According to a variant of this particular embodiment, the method comprises a step for transmission, from the sending device to the recipient device, in order to have a second action executed relating to a second data transmission protocol, of a fourth message comprising a second protocol identifier relating to said second data transmission protocol and a second action identifier relating to said second action, and a step for execution by the recipient device of said second action.

Thus, the sending device is capable very simply of controlling, by means of successive messages, the recipient device in order to have actions executed relating to a protocol or a service. The observations made by the inventors have shown that it is possible to segregate the commands relating to a service from those relating to a protocol, regardless of the service used or the protocol used.

Preferably, the method comprises a step for verification, by the recipient device, of the compatibility between the data transmission protocol identified by the second protocol identifier and the data transport service identified by the second service identifier, said step for execution of the second action being intended to be executed subject to a compatibility condition.

Correlatively, another subject of the invention is a device, comprising communication means capable of sending to a recipient device a first message and a second message,
  the first message comprising:
    a first service identifier relating to a first data transport service,
    a first data set corresponding to a configuration of said first data transport service,
  the second message comprising:
    a first protocol identifier relating to a first data transmission protocol,
    a second data set corresponding to a configuration of said first data transmission protocol,
  said communication means being designed to send the first message and the second message separately.

This first device comprises means of implementing the steps of the method according to the invention that are executed by the sending device.

Symmetrically, another subject of the invention is a device accessing a communication network, comprising
  communication means capable of receiving messages sent by a sending device and
  processing means capable of processing a first and a second message received from the sending device,
  the first message comprising:
    a first service identifier relating to a first data transport service,
    a first data set corresponding to a configuration of said first data transport service,
  the second message comprising:
    a first protocol identifier relating to a first data transmission protocol,
    a second data set corresponding to a configuration of said first data transmission protocol,
  the first message and the second message being received and processed separately.

This second device comprises means of implementing the steps of the method according to the invention that are executed by the recipient device.

The benefits stated for the inventive method can be transposed to the sending and recipient devices according to the invention.

According to one of its hardware aspects, the invention relates to a signal intended to be sent by a sending device and received by a recipient device, said signal conveying a first message comprising:
  a first service identifier relating to a first data transport service,
  a first data set corresponding to a configuration of said first data transport service,
  this first message being intended to be sent separately from a second message comprising:
    a first protocol identifier relating to a first data transmission protocol,
    a second data set corresponding to a configuration of said first data transmission protocol.

Correlatively, the invention relates to a signal intended to be sent by a sending device and received by a recipient device, said signal conveying a first message comprising:
  a first protocol identifier relating to a first data transmission protocol,
  a second data set corresponding to a configuration of said first data transmission protocol,
  this first message being intended to be sent separately from a second message comprising:
    a first service identifier relating to a first data transport service,
    a first data set corresponding to a configuration of said first data transport service.

The sending and receiving devices according to the invention are in practice intended to communicate with each other by means of such signals, each carrying a service configuration message or protocol configuration message.

BRIEF DESCRIPTION OF THE DRAWINGS

Other aims, characteristics and advantages of the invention will become apparent from the description that follows, given purely by way of non-limiting example, and with reference to the appended drawings in which.

DETAILED DESCRIPTION OF THE INVENTION

Figure 1:
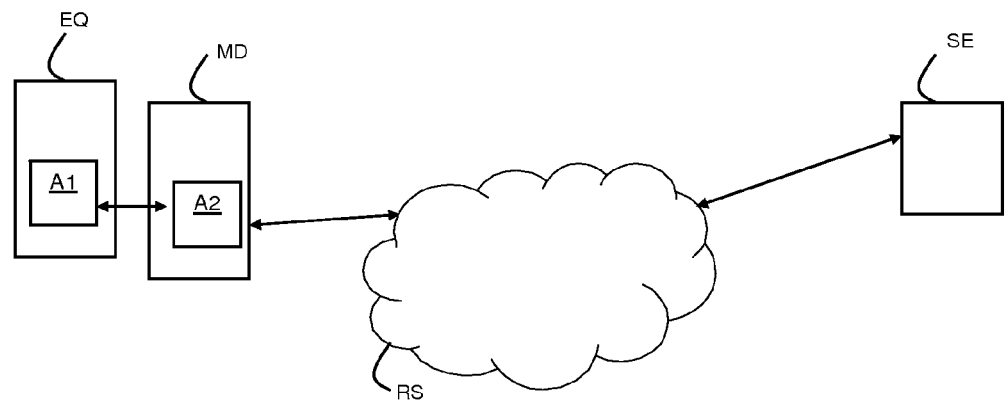
FIG. 1 is a diagrammatic representation of an exemplary system that is appropriate for implementing the invention.

FIG. 1 is a diagrammatic representation of an embodiment of a system for remotely managing piece of equipments.

This system is articulated around a telecommunication network RS. The telecommunication network RS is, for example, a cellular network, of GSM (Global System for Mobile communication), GPRS (General Packet Radio Service), UMTS (Universal Mobile Telecommunication System) type, or even an IP (Internet Protocol) network, an X25 network, and so on. The invention is described in greater detail in the embodiment in which the telecommunication network RS is a GSM/GPRS cellular network.

The system for remotely managing piece of equipments represented in FIG. 1 comprises:

a piece of equipment EQ, a communication module MD accessing the network RS, a server SE accessing the network RS.

The piece of equipment EQ incorporates an embedded application A1, intended to communicate via the telecommunication network RS with the server SE.

The interaction with the piece of equipment is performed by data interchanges between the embedded application A1 and the server SE. These data interchanges can be performed by using "message mode" communications (communication by command/response type messages) or "session mode" communications (communication by a stream of data).

In the embodiment of FIG. 1, the embedded application A1 communicates with the server SE via an application A2 of the communication module MD. The communication module MD thus serves as a gateway or communication relay for the piece of equipment EQ, the data sent by the embedded application A1 and intended for the server SE being routed via the communication module MD.

The communication module MD and the piece of equipment EQ, or more specifically the application A1 and the application A2, communicate with each other via a wired or wireless local communication link. Any type of communication link that allows for the transmission of data can be envisaged. In an alternative embodiment, the communication module MD is incorporated in the piece of equipment EQ.

The communication module MD incorporates a communication interface for accessing the network RS and a communication interface with the piece of equipment EQ. A modem is, for example, used to access the network. The communication module MD further comprises a software module for controlling the communication interfaces with a view to the communication with the embedded application A1 and/or the server SE.

The communication method according to the invention applies to communication between two devices having to communicate in message mode. It is described in the context of its application to communication between the piece of equipment EQ, forming the command-sending device and the communication module MD, forming the device receiving these commands, executing, on a command from the piece of equipment EQ, actions for sending or receiving data via the telecommunication network RS.

The invention is generally applied to communication by commands between two devices, one of which executes, on command from the other, actions in order to access a network, send or receive data via the telecommunication network RS.

These actions are, for example, actions relating to a data transport service or to a data transmission protocol, services or protocols available in the network RS.

An action relating to a data transport service is, for example, an action conforming to this service, or an information request relating to an action conforming to this service:

opening or closure of a connection or communication session with a server to use this service, a request for information concerning the status of a connection conforming to this service.

Any other action can also be envisaged.

An action relating to a data transmission protocol is, for example, an action conforming to this protocol, or an information request relating to an action conforming to this protocol, for example:

a) sending or receiving a message, b) transferring or downloading data, c) requesting the interruption of one of the actions cited in a) or b), d) an information request relating to one of the actions cited in a) or b).

Any other action can also be envisaged.

The data transport service used for the communication via the network RS between the communication module MD and the server SE is, for example:

the short message service SMS (Short Message Service), the unstructured supplementary service data service USSD, (Unstructured Supplementary Service Data), the data transmission service in circuit mode CSD (Circuit Switched Data) or HSCSD (High Speed Circuit Switched Data), the general packet radio service GPRS.

Any other data transport service suitable for setting up a connection in order to send data is also appropriate.

The data transmission protocol used for the communication via the network RS is, for example:

the BEEP (Block-Extensible Exchange Protocol) protocol, the HTTP or HTTPS (the secure version of HTTP, Hyper-Text Transfer Protocol) protocol, the FTP protocol, etc.

Any other protocol suitable for sending/receiving messages or transferring/downloading data is also appropriate.

A priori, one or more protocols can be used in combination with each of these data transport services in order to route a message or exchange data, provided that the protocol is compatible with the service.

Figure 2:
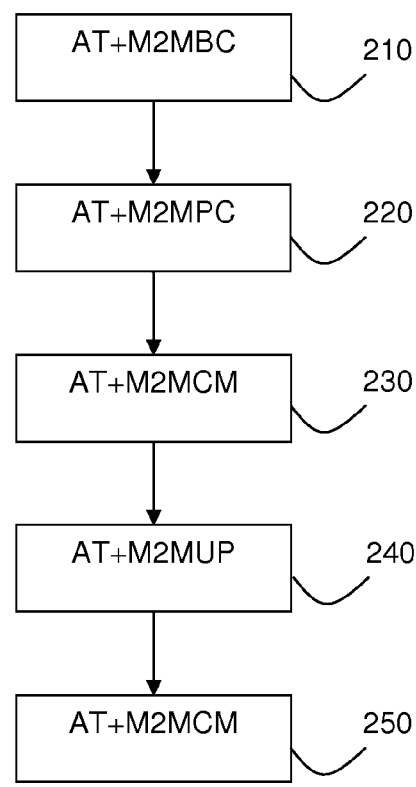
FIG. 2 is a flow diagram of a first embodiment of the inventive method.
Figure 3:
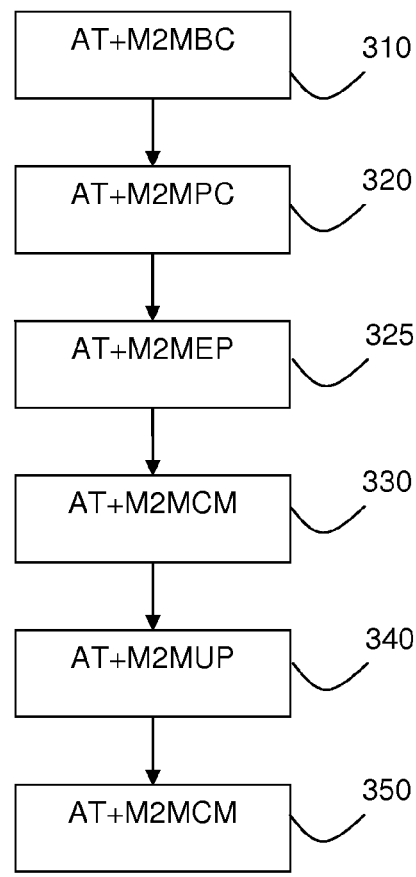
FIG. 3 is a flow diagram of a second embodiment of the inventive method.
Figure 4:
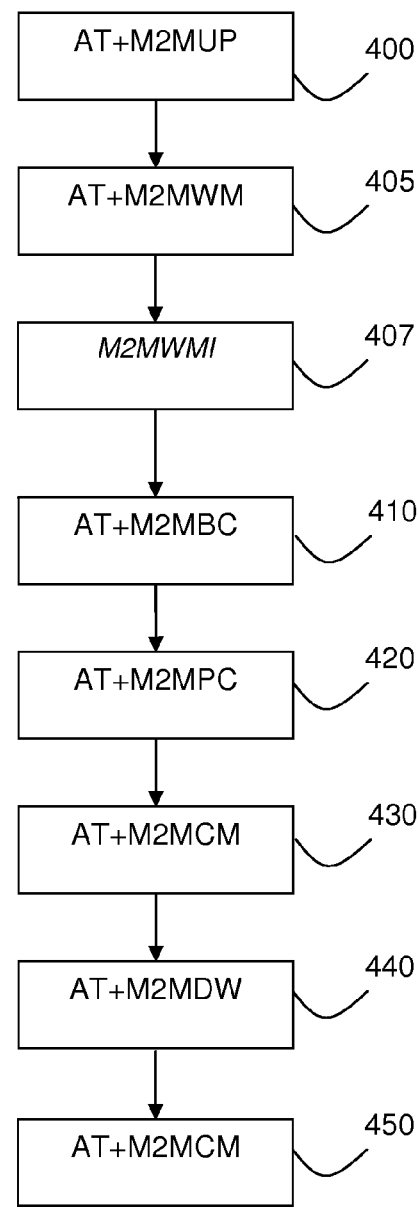
FIG. 4 is a flow diagram of a third embodiment of the inventive method.

FIGS. 2 to 4 illustrate different embodiments of the method according to the invention. In these examples, the communication proceeds between a sending device corresponding to the piece of equipment EQ and a recipient device corresponding to the communication module MD.

The messages are sent in the form of commands, for example AT commands. The messages likely to be sent from the embedded application A1 to the application A2 are, for example, as follows:

a message, named AT+M2MBC, for sending configuration data relating to a data transport service;

a message, named AT+M2MPC, for sending configuration data relating to a data transmission protocol;

a message, named AT+M2MEP, for sending configuration data relating to a data transmission protocol, complementing data previously sent by means of an AT+M2MPC message;

a command message, named AT+M2MCM, for the execution of an action relating to a data transport service, for example the opening or closure of a connection to a server to use this data transport service;

a command message, named AT+M2MUP, for the execution of a data transmission from the piece of equipment EQ to a remote device, in accordance with a data transmission protocol;

a command message, named AT+M2MDW, for the execution of a data transmission from a remote device to the piece of equipment EQ, in accordance with a data transmission protocol.

Each of these messages relates either to a data transport service or to a data transmission protocol.

Each of these messages is likely to include one or more parameters. These different parameters are described in the appended tables 1 and 2, which give: the name of the parameter, its data format (integer number or alphanumeric character string), its meaning and the possible values when these are predefined. Table 1 specifies the parameters of the messages relating to a data transport service, whereas table 2 specifies the parameters for messages relating to a data transmission protocol.

The messages AT+M2MUP and AT+M2MDW can also include command parameters relating to the protocol and to the service, data intended for transmission to, or respectively from, a remote device, for example the server SE.

Each of these messages has an associated list of parameters likely to be sent with the message, some of these parameters being optional. The messages cited above comprise the following parameters, the optional parameters being indicated between square brackets:

message AT+M2MBC:
Bearer, BearerConfig, AccessPoint [, Login] [, Password] [, RetryNr, Interval]
message AT+M2MPC:
Protocol, ProtocolConfig, Server [, TcpPort] [, Id1] [, Id2] [, ProtocolProfile]
message AT+M2MEP:
Protocol, ProtocolConfig [, Data1] [, Data2] [, DataN]
message AT+M2MCM:
Action, Bearer, BearerConfig
message AT+M2MUP:
Protocol [, ProtocolConfig] [, Encoding] [, Length] [, MsgRef] [, Id2], Message1
message AT+M2MDW:
Protocol [, ProtocolConfig]

The message AT+M2MEP is used, for example, to transmit configuration data relating to a file transfer by means of the FTP protocol. In this case:
- the "Data1" parameter gives the name of the source directory containing the file to be transferred,
- the "Data2" parameter gives the name of the file to be transferred,
- the "Data3" parameter gives the name of the destination directory to which the file must be transferred,
- the "Data4" parameter gives the name of the destination file, in the case where the file must be renamed after the transfer.

The message AT+M2MEP can also be used to send other types of parameters, for example connection identifier, password, etc.

Apart from the AT+M2MEP command, making it possible to send configuration data Data1, Data2, . . . DataN specific to a protocol, the format of the messages, that is, the succession of the parameters contained in these messages and the general meaning of these parameters, are predetermined and independent of the transport service or of the protocol concerned, whether they are mandatory or optional parameters. Consequently, these messages can be used for any data transmission protocol or any data transport service, and they will be interpreted correctly by the recipient device.

The interpretation of the values assigned to some of these parameters, for example the parameters Id1 and Id2 conveying identification and/or authentication data, can depend on the protocol used, since the use of a data transmission by a given protocol requires identification and/or authentication data in a form that is often specific to this protocol: MSISDN number (BEEP protocol), electronic messaging address (SMTP protocol), identifier or password of an internet access account user (FTP protocol), etc.

As will be described hereinbelow, the sending of a message from the sending device to the recipient device each time causes a processing operation to be executed on the message received by the recipient device.

Conversely, the MD module sends, spontaneously or on request from the piece of equipment EQ, messages to the piece of equipment EQ.

These messages are, for example:
the sending of unsolicited information, for example concerning events such as the receipt of an SMS, indication concerning the status of the network or the status of a connection to the network, incoming call notification, message transmittal acknowledgement, acknowledgement following the completion of an action, etc. acknowledgement or error indications, relating, for example, to the receipt of a command, to an attempt to connect to the network, to an internal operating error, etc.

It is, for example, a message named +M2MWMI for notifying the piece of equipment EQ of the arrival of a wake-up message. The message +M2MWMI includes the following list of parameters:
Protocol, Encoding, Id2, Date, Length.

An example of use of such a message will be described later with respect to FIG. 4 (see description of the step 407).

FIG. 2 illustrates a first embodiment of the method according to the invention. In this example, a message of e-mail type is sent using the CSD transport service.

In the step 210, a message cmd210 defining a first configuration profile for the CSD service is sent from the sending device to the recipient device. This message consists of the following elements:

AT+M2MBC, 0, 0, "+33145294529"
This message comprises, in turn:
a code "AT+M2MBC" identifying the command,
the "Bearer" parameter taking the value "0", identifying the CSD service (see table 1),
the "BearerConfig" parameter taking the value "0", identifying a configuration data set relating to a first configuration profile for the identified service, this configuration data being attached to this same message;
the "AccessPoint" parameter taking the value "+33145294529", forming part of the configuration data of the identified service and indicating in this case the number of the access point.

The configuration data set is therefore limited in this case to a single, unique parameter, which is the number of the access point.

On receipt of this message, the recipient device stores this data set in a first memory, associated with the identifier of the service and the identifier of the data set. In this way, the recipient device can restore this data set from the service identifier and the identifier of the set.

The identifier of a service configuration data set is in fact intended to be inserted by the sending device in a subsequent message in order to specify a configuration of the service to be used for the execution of an action relating to this service.

In the step 220, a message cmd220 defining a first configuration protocol for the SMTP protocol is sent from the sending device to the recipient device. This message consists of the following elements:

AT+M2MPC, 2, 0, "smtp.orange.fr", 25, "device1232@mycompany.fr", "device4323@mycompany.fr", 0
This message comprises, in turn:
a code "AT+M2MPC" identifying the command,
the "Protocol" parameter taking the value "2", identifying the SMTP protocol (see table 2),
the "ProtocolConfig" parameter taking the value "0", identifying a configuration data set relating to a first configuration profile for the identified protocol, this configuration data being attached to this same command;

the "Server" parameter taking the value "smtp.orange.fr", forming part of the configuration data of the protocol identified in the current message and indicating the address of an SMTP server;

the "TcpPort" parameter taking the value "25", forming part of the configuration data of the protocol identified in the current message and indicating a number of the port of the SMTP server to be used;

the "Id1" parameter taking the value "device1232@mycompany.fr", forming part of the configuration data of the protocol identified in the current message and indicating an address associated with the application A1;

the "Id2" parameter taking the value "device4323@mycompany.fr", forming part of the configuration data of the protocol identified in the current message and indicating an address of an application of a remote device, for example an application of the server SE;

the "ProtocolProfil" parameter, taking the value "0", forming part of the configuration data of the protocol identified in the current message and identifying a profile of the SMTP protocol to be used;

On receipt of this message, the recipient device stores this set in a second memory in association with the identifier of the protocol and the identifier of the set. In this way, the recipient device can restore this data set from the identifier of the protocol and the identifier of the set.

The identifier of a protocol configuration data set is in fact intended to be inserted by the sending device in a subsequent message in order to specify a configuration of the protocol to be used for the execution of an action relating to this protocol.

In the step 230, a command message cmd230, for the execution of an action conforming to a data transport service, is sent from the sending device to the recipient device. This message consists of the following elements:

AT+M2MCM, 1, 0, 0

This message comprises, in turn:

a code "AT+M2MCM" identifying the command, the "Action" parameter taking the value "1", identifying an action to be executed, in this case the opening of a connection (see table 1), the "Bearer" parameter taking the value "0", identifying the CSD service (see table 1), the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the identifier of the set supplied in this message. If successful, it executes the requested action, in this case, the opening of a CSD connection with the server identified in the service configuration data set extracted from the memory.

In the step 240, a message cmd240 to request the sending of data, which in this case takes the form of text, is sent from the sending device to the recipient device.

This message consists of the following elements:

AT+M2MUP, 2, 0, 0, 12, 0, 0, "Hello World!"

This message comprises, in turn:

a code "AT+M2MUP" identifying the command, the "Protocol" parameter taking the value "2", identifying the SMTP protocol (see table 2), the "ProtocolConfig" parameter taking the value "0", identifying a configuration data set, sent in a preceding message, this configuration data therefore not being attached to this message;

the "Encoding" parameter taking the value "0", identifying an encoding or compression format used for the data to be transmitted;

the "Length" parameter taking the value "12", indicating the length in terms of number of characters of the text to be sent;

the "MsgRef" parameter taking the value "0", indicating a reference number associated with the data to be transmitted;

the "Id2" parameter taking the value "0", forming part of the parameters for sending the text and indicating that the address of the recipient is that defined in the command AT+M2MPC;

the "Message1" parameter taking the value "Hello World!", indicating the text to be sent, in the form of an alphanumeric character string.

On receipt of this message, the recipient device searches, in the memory in which the protocol configuration data is stored, for a set stored in association with the protocol identifier and the set identifier supplied in this message. If successful, the recipient device checks that the service identified in the preceding message cmd230 is compatible with the protocol identified in the current message cmd240. In case of compatibility, the recipient device executes the requested action, in this case the sending of the text, by means of a CSD connection as set up following the message cmd230 and conforming to the SMTP protocol identified in the current message cmd240, in a configuration defined by the protocol configuration data set extracted from the memory.

In the step 250, a command message cmd250, for the execution of an action conforming to a data transport service, is sent from the sending device to the recipient device. This message consists of the following elements:

AT+M2MCM, 0, 0, 0

This message comprises, in turn:

a code "AT+M2MCM" identifying the command, the "Action" parameter taking the value "0", identifying an action to be executed, in this case the closure of a connection (see table 1), the "Bearer" parameter taking the value "0", identifying the CSD service (see table 1), the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the set identifier supplied in this message. If successful, it executes the requested action, in this case the closure of the CSD connection set up with the server identified in the configuration data set extracted from the memory.

FIG. 3 illustrates a second embodiment of the method according to the invention. In this example, a file is transferred to an FTP server. The method proceeds substantially in the same way as in the embodiment of FIG. 2, the steps 310, 320, 330, 340 and 350 being respectively identical to the steps 210, 220, 230, 240 and 250, except, however, that the parameters of the messages sent are different.

In the step 310, a message cmd310 defining a first configuration profile for the data transport GPRS service is sent from the sending device to the recipient device. This message consists, for example, of the following:

AT+M2MBC, 2, 0 "orange.fr", "orange", "orange"

This message comprises, in turn:
a code "AT+M2MBC" identifying the command,
the "Bearer" parameter taking the value "2", identifying the GPRS service (see table 1),
the "BearerConfig" parameter taking the value "0", identifying a configuration data set relating to a first configuration profile for the identified service, this configuration data being attached to this same message;
the "AccessPoint" parameter taking the value "orange.fr", forming part of the configuration data of the identified service and indicating in this case the name of the server serving as the access point,
the "Login" parameter taking the value "orange" forming part of the configuration data of the identified service and in this case indicating a connection identifier or login;
the "Password" parameter taking the value "orange" forming part of the configuration data of the identified service and in this case indicating a password.

On receipt of this message, the recipient device stores, in the first memory, the service configuration data set, in association with the service identifier and the set identifier.

In the step 320, a message cmd320 defining a first configuration profile for the FTP protocol is sent from the sending device to the recipient device. This message consists of the following elements:

AT+M2MPC, 4, 0, "ftp.orange.fr", 21, "anonymous", "anonymous@", 0

This message comprises, in turn:
a code "AT+M2MPC" identifying the command,
the "Protocol" parameter taking the value "4", identifying the FTP protocol (see table 2),
the "ProtocolConfig" parameter taking the value "0", identifying a configuration data set relating to a first configuration profile for the identified protocol, this configuration data being to the same command;
the "Server" parameter taking the value "ftp.orange.fr", forming part of the configuration data of the protocol identified in the current message and indicating the address of an FTP server;
the "TcpPort" parameter taking the value "21", forming part of the configuration data of the protocol identified in the current message and indicating a number of the port of the FTP server to be used;
the "Id1" parameter taking the value "anonymous", forming part of the configuration data of the protocol identified in the current message and indicating an FTP login;
the "Id2" parameter taking the value "anonymous@", forming part of the configuration data of the protocol identified in the current message and indicating an FTP password;
the "ProtocolProfil" parameter taking the value "0", forming part of the configuration data of the protocol identified in the current message and identifying a profile of the FTP protocol to be used.

On receipt of this message, the recipient device stores, in the second memory, this data set, in association with the protocol identifier and the set identifier.

In the step 325, a message cmd325 defining additional configuration data for the FTP protocol is sent from the sending device to the recipient device. This message consists of the following elements:

AT+M2MEP, 4, 0, _, _, "/list", "readme.txt",

This message comprises, in turn:
a code "AT+M2MEP" identifying the command,
the "Protocol" parameter taking the value "4", identifying the FTP protocol (see table 2),
the "ProtocolConfig" parameter taking the value "0", identifying a configuration data set, sent in a preceding message, this configuration data therefore not being attached to this message;
the "Data1" and Data2" parameters are in this case omitted (which is signified by means of the character "_"), because they are not necessary for the data transmission operation to follow, which will be executed in the step 340;
the "Data3" parameter taking the value "/list", forming part of the complementary configuration data of the protocol identified in the current message and indicating the directory into which the file must be transferred;
the "Data4" parameter taking the value "readme.txt", forming part of the complementary configuration data of the protocol identified in the current message and indicating the name of the file to be transferred.

On receipt of this message, the recipient device stores, in the second memory, this complementary data set, in association with the protocol identifier and the set identifier.

In the step 330, a command message cmd330 for the execution of an action conforming to the GPRS data transport service, is sent from the sending device to the recipient device. This message consists of the following elements:

AT+M2MCM 1, 2, 0

This message comprises, in turn:
a code "AT+M2MCM" identifying the command,
the "Action" parameter taking the value "1", identifying an action to be executed, in this case the opening of a connection (see table 1),
the "Bearer" parameter taking the value "2", identifying the GPRS service (see table 1),
the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the identifier of the set supplied in this message. If successful, it executes the requested action, in this case, the opening of a GPRS connection with the server identified in the service configuration data set extracted from the memory.

In the step 340, a message cmd340 to request the sending of a file. This message consists of the following elements:

AT+M2MUP, 4, 0, 3, 250, 0, 0

This message comprises, in turn:
a code "AT+M2MUP" identifying the command,
the "Protocol" parameter taking the value "4", identifying the FTP protocol (see table 2),
the "ProtocolConfig" parameter taking the value "0", identifying a configuration data set, sent in a preceding message, this configuration data therefore not being attached to this message;
the "Encoding" parameter taking the value "3", indicating a file encoding or compression mode;

the "Length" parameter taking the value "250", indicating the length of the file in number of octets;

the "MsgRef" parameter taking the value "0", indicating a reference associated with the message;

the "Id2" parameter taking the value "0", forming part of the parameters for sending the file and indicating that the destination address for the sending of the file is that sent with the AT+M2MEP command.

On receipt of this message, the recipient device searches, in the memory in which the protocol configuration data is stored, for a set stored in association with the protocol identifier and the data set identifier supplied in this message. It also searches to see if there is a complementary data set stored in association with the protocol identifier and the set identifier supplied in this message. If a configuration data set is obtained, the recipient device checks that the service identified in the preceding message cmd330 is compatible with the protocol identified in the current message cmd340.

In case of compatibility, the recipient device executes the requested action, in this case the sending of the text, by means of a GPRS connection as set up following the message cmd330 and conforming to the FTP protocol identified in the current message cmd340, in a configuration defined by the protocol configuration data set extracted from the memory, and taking into account the complementary data set sent with the message cmd320 which, in the case of an FTP transfer, identifies the file to be transferred.

In the step 350, a command message cmd350, for the execution of an action relating to a data transport service, is sent from the sending device to the recipient device. This message consists of the following elements:

AT+M2MCM, 0, 2, 0

This message comprises, in turn:

a code "AT+M2MCM" identifying the command, the "Action" parameter taking the value "0", identifying an action to be executed, in this case the closure of a connection (see table 1), the "Bearer" parameter taking the value "2", identifying the GPRS service (see table 1), the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the set identifier supplied in this message. If successful, it executes the requested action, in this case the closure of the GPRS connection set up with the server identified in the configuration data set extracted from the memory.

FIG. 4 illustrates a third embodiment of the method according to the invention. In this example, an SMS message is sent on request from the sending device. Then, the latter receives a UGPRS message (accompanied by a wake-up message) and downloads it using the GPRS service and the BEEP protocol. The method proceeds substantially identically to the embodiment of FIG. 2, the steps 410, 420, 430, 440 and 450 being respectively identical to the steps 210, 220, 230, 240 and 250, except that the parameters of the messages sent are different.

In the step 400, a message cmd400 to request the sending of data in text form using the SMS service. This message consists of the following elements:

AT+M2MUP, 0, 0, 0, 12, 0, 0, "Hello World!"

This message comprises, in turn:

a code "AT+M2MUP" identifying the command, the "Protocol" parameter taking the value "0", identifying the SMS protocol (see table 2), the "ProtocolConfig" parameter taking the value "0", identifying a configuration data set, sent in a preceding message, this configuration data therefore not being attached to this message;

the "Encoding" parameter taking the value "0", indicating an encoding or compression format for the data to be transmitted;

the "Length" parameter taking the value "12", indicating the length of the data to be sent in number of octets;

the "MsgRef" parameter taking the value "0", indicating a reference associated with the data to be transmitted;

the "Id2" parameter taking the value "0", indicating that the destination address for the sending of the file is that sent with the AT+M2MPC command;

the "Message1" parameter taking the value "Hello World!", indicating the text to be sent, in the form of an alphanumeric character string.

In the case of a communication by means of the SMS service, there is no need to set up a communication session prior to the sending of the message. In this particular case, the definition of the protocol is included in that of the data transport service. Consequently, the configuration parameters of the associated transport service can be omitted, the SMS service being similar to a protocol. In this case, the recipient device does not need to check a compatibility between a protocol and a service.

On receipt of this message, the recipient device searches, in the memory in which the protocol configuration data is stored, for a set stored in association with the protocol identifier and the set identifier supplied in this message.

If such a set is obtained, the recipient device executes the requested action, in this case the sending of the message, by means of the SMS service in a configuration defined by the protocol configuration data set extracted from the memory.

In the step 405, a message cmd405 to request the configuration of a wake-up function for the piece of equipment EQ. This message consists of the following elements:

AT+M2MWM, 1, "+33612341234"

This message comprises, in turn:

a code "AT+M2MWM" identifying the command, the parameter "1", identifying that a wake-up function is being activated, the "+33612341234", parameter, identifying the address of the entity authorized to send wake-up messages, only messages from that address being taken into account to apply the wake-up function.

In the step 407, a notification message cmd407 is sent from the module MD to the piece of equipment EQ. This is a notification indicating the availability on a remote server of data intended for the piece of equipment EQ. This notification message is sent spontaneously by the module MD to the piece of equipment EQ, following the receipt by the module MD of a wake-up message originating from an entity. This message cmd 407 consists of the following:

M2MWMI, 1, 0, "+33612341234", "01/19/2006", 314

This message cmd407 comprises, in turn:

a code "M2MWMI" identifying a notification command following a wake-up message, a "Protocol" parameter taking the value "1", identifying the protocol to be used to load data intended for the piece of equipment;

an "Encoding" parameter taking the value "0", indicating the encoding format of the data intended for the piece of equipment;

an "Id2" parameter taking the value "+33612341234", identifying the entity having sent the wake-up message;

a "Date" parameter taking the value "01/19/2006", indicating the date from which the data is available on the server;

a "Length" parameter taking the value "314", indicating the length of the data intended for the piece of equipment in octets.

In the step 410, following the notification of the step 407, a message cmd410 defining a first configuration profile for the GPRS data transport service is sent from the sending device to the recipient device. This message consists, for example, of the following:

AT+M2MBC, 2, 0, "m2m.orange.co.uk", "m2mconnect", "m2mconnect", 5, 60

This message comprises, in turn:

a code "AT+M2MBC" identifying the command, the "Bearer" parameter taking the value "2", identifying the GPRS service (see table 1), the "BearerConfig" parameter taking the value "0", identifying a configuration data set relating to a first configuration profile for the identified service, this configuration data being attached to this same message;

the "AccessPoint" parameter taking the value "m2m.orange.co.uk", forming part of the configuration data of the identified service and in this case indicating the name of the server acting as access point, the "Login" parameter taking the value "m2mconnect" forming part of the configuration data of the identified service and in this case indicating a connection identifier or login;

the "Password" parameter taking the value "m2mconnect" forming part of the configuration data of the identified service and in this case indicating a password;

the "RetryNr" parameter taking the value "5" forming part of the configuration data of the identified service and indicating the number of connection attempts for setting up a connection conforming to the service identified in the current message;

the "Interval" parameter taking the value "60" forming part of the configuration data of the identified service and indicating the duration in seconds of the time interval between two connection attempts.

On receipt of this message, the recipient device stores, in the first memory, the service configuration data set, in association with the service identifier and the set identifier.

In the step 420, a message cmd420 defining a first configuration profile for the BEEP protocol is sent from the sending device to the recipient device. This message consists of the following elements:

AT+M2MPC, 1, 0, "10.168.50.75", "10288", "+33656785678", "+33612341255", 0

This message comprises, in turn:

a code "AT+M2MPC" identifying the command, the "Protocol" parameter taking the value "1", identifying the BEEP protocol (see table 2), the "ProtocolConfig" parameter taking the value "0", identifying a configuration data set relating to a first configuration profile for the identified protocol, this configuration data being attached to this same command;

the "Server" parameter taking the value "10.168.50.75", forming part of the configuration data of the protocol identified in the current message and indicating the IP address of a BEEP server;

the "TcpPort" parameter taking the value "10288", forming part of the configuration data of the protocol identified in the current message and indicating a number of the port of the BEEP server to be used;

the "Id1" parameter taking the value "+33656785678", forming part of the configuration data of the protocol identified in the current message and indicating the MSISDN number of the sending application A1;

the "Id2" parameter taking the value "+33612341255", forming part of the configuration data of the protocol identified in the current message and the MSISDN number of a recipient application, implemented, for example, in the server SE;

the "ProtocolProfil" parameter taking the value "0", forming part of the configuration data of the protocol identified in the current message and identifying a profile of the BEEP protocol to be used.

On receipt of this message, the recipient device stores this data set in the second memory in association with the protocol identifier and the set identifier.

In the step 430, a command message cmd430, for the execution of an action conforming to the GPRS data transport service, is sent from the sending device to the recipient device. This message consists of the following elements:

AT+M2MCM, 1, 2, 0

This message comprises, in turn:

a code "AT+M2MCM" identifying the command, the "Action" parameter taking the value "1", identifying an action to be executed, in this case the opening of a connection (see table 1), the "Bearer" parameter taking the value "2", identifying the GPRS service (see table 1), the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the set identifier supplied in this message. If successful, it executes the requested action, in this case the opening of a GPRS connection with the server identified in the service configuration data set extracted from the memory.

In step 440, a message cmd440 to request the receipt of data via the BEEP protocol. This message consists of the following elements:

AT+M2MDW, 1, 0

This message comprises, in turn:

a code "AT+M2MDW" identifying the command, the "Protocol" parameter taking the value "1", identifying the BEEP protocol (see table 2), the "ProtocolConfig" parameter taking the value "0", identifying a configuration data set, sent in a preceding message, this configuration data therefore not being attached to this message.

On receipt of this message, the recipient device searches, in the memory in which the protocol configuration data is stored, for a set stored in association with the protocol identifier and the set identifier supplied in this message. If a configuration data set is obtained, the recipient device checks that the service identified in the preceding message cmd430 is compatible with the protocol identified in the current message cmd440.

In case of compatibility, the recipient device executes the requested action, in this case the downloading of the message, by means of a GPRS connection as set up following the cmd430 message and conforming to the BEEP protocol identified in the current message cmd440, in a configuration defined by the protocol configuration data set extracted from the memory.

In the step 450, a command message cmd450, for the execution of an action relating to a data transport service, is sent from the sending device to the recipient device. This message consists of the following elements:

AT+M2MCM, 0, 2, 0

This message comprises, in turn:
- a code "AT+M2MCM" identifying the command,
- the "Action" parameter taking the value "0", identifying an action to be executed, in this case the closure of a connection (see table 1),
- the "Bearer" parameter taking the value "2", identifying the GPRS service (see table 1),
- the "BearerConfig" parameter taking the value "0", identifying a configuration data set, sent in a preceding message, this configuration data therefore not being attached to this message.

On receipt of this message, the recipient device searches, in the memory in which the service configuration data is stored, for a set stored in association with the service identifier and the set identifier supplied in this message. If successful, it executes the requested action, in this case the closure of the GPRS connection set up with the server identified in the configuration data set extracted from the memory.

Preferably, the various steps of the method according to the invention are implemented by means of program instructions and executed by a data processor of the sending device (piece of equipment EQ) and a data processor of the recipient device (modem MD), processors using programs or subroutines designed for the execution of the various steps of this method implemented respectively by the sending device and the recipient device.

Consequently, the invention also targets a program, of computer program type, stored on an information medium, this program being able to be implemented by a data processor, this program comprising instructions adapted to apply the steps of the method as mentioned hereinabove.

This program can use any programming language, and be in the form of source code, object code or intermediate code between source code and object code, such as in a partially compiled form, or in any other desirable form.

The invention also targets an information medium that can be read by a computer, and that comprises instructions of a computer program as mentioned hereinabove.

The information medium can be any entity or device capable of storing the program. For example, the medium can comprise a storage means, such as a ROM, for example a CD ROM or a microelectronic circuit ROM, or even a magnetic storage means, for example a diskette (floppy disk) or a hard disk.

Also, the information medium can be a transmissible medium such as an electrical or optical signal, which can be routed via an electrical or optical cable, by radio or by other means. The program according to the invention can in particular be downloaded over an Internet-type network.

Alternatively, the information medium can be an integrated circuit in which the program is incorporated, the circuit being adapted to execute or to be used in the execution of the method concerned.

The invention makes it possible to segregate the configuration of the data transport service from the configuration of the protocol. Once the communication connection is set up, any protocol compatible with that link can be used, the data being sent or received without having to worry about the connection. The result is a simplification of the communication.

This invention is applicable to all machine-to-machine communication systems. It provides a generic communication solution, one modem being able to be easily replaced by another.

It also applies not only to the communication between a piece of equipment and a modem in the context of an M2M application, but more generally to any sending device, communicating with a recipient device, this recipient device accessing a communication network and executing, on behalf of the sending device, accesses to the network and communication actions via the network.

It allows for any type of communication, the sending of SMS messages, the sending of e-mail type electronic mail, FTP file transfer, or any other data transfer, and with a limited set of messages, it being possible to use one and the same message to send an SMS message or a GPRS message.

APPENDIX

TABLE 1

| Parameter name | Format | Possible values | Meaning |
| --- | --- | --- | --- |
| Bearer | Integer number | 0 - CSD<br>1 - SMS<br>2 - GPRS<br>3 - EDGE<br>4 - UMTS | Identifier of a data transport service; preferably the possible values are predefined and each associated with a predefined service |
| BearerConfig | Integer number | 0 to N<br>0 for the default service | Identifier of a configuration data set relating to a possible configuration of a data transport service |
| AccessPoint | Character string | | Identifier of the access point to the network making it possible to set up a connection conforming to a service, in the form of the name of the access point or a telephone number; in the case of the SMS service, the MSISDN number of the message server centre is indicated |
| Login | Character string | | Identifier or login to be used to set up a connection conforming to a data transport service; in the case of an SMS, the MSISDN number of the SIM card of the modem or of the device originating the connection request is indicated |

TABLE 1-continued

| Parameter name | Format | Possible values | Meaning |
| --- | --- | --- | --- |
| Password | Character string | | Password to be used in case of authentication on setting up a connection conforming to a data transport service |
| RetryNr | Integer number | >=1 Value 1 by default | Number of connection attempts on setting up a connection conforming to a data transport service |
| Interval | Integer number | >=1 Value 30 by default | Time interval expressed in seconds between two connection attempts on setting up a connection conforming to a data transport service |
| Action | Integer number | 1 = open connection 0 = close connection | Identifier of an action to be executed conforming to a data transport service |

TABLE 2

| Parameter name | Format | Possible values | Meaning |
| --- | --- | --- | --- |
| Protocol | Integer number | 0 - SMS 1 - BEEP 2 - SMTP 3 - POP 4 - FTP 5 - HTTP | Identifier of a data transmission protocol; preferably the possible values are predefined and each associated with a predefined protocol |
| ProtocolConfig | Integer number | 0 to N 0 for the default protocol | Identifier of a configuration data set relating to a possible configuration of a data transmission protocol |
| Server | Character string | | IP address or name of the remote server used for the data transmission |
| TcpPort | Integer number | | TCP port number for the connection to the remote server identified by the "Server" parameter |
| Id1 | Character string | | Identification or authentication data relating to a user account and/or a device, for example: MSISDN number of a terminal SIM card (BEEP); electronic messaging address (SMTP); user account login (FTP); |
| Id2 | Character string | | Identification or authentication data relating to a user account and/or a device; for example: MSISDN number of a terminal SIM card (BEEP); electronic messaging address (SMTP); user account password (FTP); |
| ProtocolProfile | Character string | | Profile of the protocol to be used, in particular in the case of the BEEP protocol; in the case of the HTTP protocol, the profile is GET or POST; in the case of the FTP protocol, the profile is 0 for a transfer in ASCII mode and 1 for a transfer in binary mode; |
| Data1, Data2, . . . DataN | Character string or integer number | | Supplementary configuration data specific to a data transmission protocol. |
| Encoding | | | Identifier of an encoding or compression format of the data to be transmitted |
| Length | | | Length of the data to be transmitted in octets |
| MsgRef | | | Reference associated with the data to be transmitted |
| Message1 | Character string | | Content of a message to be transmitted according to a data transmission protocol |

The invention claimed is:

1. A method for controlling, by a sending device, a set up of a machine-to-machine communication link to be established by a recipient device, the method being implemented by the sending device and comprising:
configuring a data transport service usable for setting up a communication link by transmitting to the recipient device at least one first message comprising:
a first service identifier identifying a first data transport service, and
a first data set identifier identifying a first data set,
said first data set comprising configuration data of said first data transport service for configuring said communication link,
configuring a data transmission protocol usable for transmitting said data through said communication link by transmitting, separately from the at least one first message, after transmitting the at least one first message, the at least one second message comprising:
a first protocol identifier identifying a first data transmission protocol, and
a second data set identifier identifying a second data set, said second data set comprising data transmission protocol configuration data of said first data transmission protocol,
controlling the setting up of said communication link by transmitting to the recipient device a third message after transmitting the at least one first message, the third message comprising:
said first service identifier identifying said first data transport service,
said first data set identifier, and
a first action identifier identifying a first action relating to said first data transport service, said first action being executed on receipt of said third message by the recipient device using said first data set identified by said first data set identifier,
controlling the transmission of data through said communication link by transmitting to the recipient device of
a fourth message after transmitting the at least one second message, wherein the fourth message comprising:
said first protocol identifier identifying said first data transmission protocol,
said second data set identifier, and
a second action identifier identifying a second action relating to said first data transmission protocol, said second action being executed on receipt of said fourth message by the recipient device using said second data set identified by said second data set identifier.

2. The method as claimed in claim 1, wherein the format of the first message is independent of the data transport service identified by the first service identifier.

3. The method as claimed in claim 1, wherein the format of the second message is independent of the data transmission protocol identified by the first protocol identifier.

4. The method as claimed in claim 1, the first message comprising a first data set identifier, the method further comprising:
storing, by the recipient device, in a first memory, of said first data set in association with said first service identifier and with said first data set identifier.

5. The method as claimed in claim 1, the second message comprising a second data set identifier, the method further comprising:
storing, by the recipient device in a second memory, of said second data set in association with said first protocol identifier and with said second data set identifier.

6. The method as claimed in claim 1, further comprising:
verifying, by the recipient device, the compatibility between the data transmission protocol identified by the first protocol identifier and the data transport service identified by the first service identifier, said step for execution of the second action being intended to be executed subject to a compatibility condition.

7. The method as claimed in claim 1, further comprising:
verifying, by the recipient device, the compatibility between the data transmission protocol identified by the second protocol identifier and the data transport service identified by the second service identifier, said step for execution of the second action being intended to be executed subject to a compatibility condition.

8. The method as claimed in claim 1, wherein the configuration data of said first data transmission protocol comprises an address or name of a remote server with which the recipient device can communicate.

9. A sending device, for controlling a set up of a machine-to-machine communication link to be established by a recipient device, comprising communication means for configuring a data transport service usable for setting up a communication link by sending separately to the recipient device, at least one first message and, after sending the at least one first message, sending at least one second message,
said first message comprising:
a first service identifier identifying a first data transport service, and
a first data set identifier identifying a first data set,
said first data set comprising data transport service configuration data of said first data transport service,
said second message comprising:
a first protocol identifier identifying a first data transmission protocol usable for transmitting said data through said communication link, and
a second data set identifier identifying a second data set,
said second data set comprising data transmission protocol configuration data of said first data transmission protocol,
the sending device further comprising:
communication means for controlling the setting up of said communication link by sending to said recipient device a third message after sending the at least one first message, the third message comprising:
said first service identifier identifying said first data transport service,
said first data set identifier, and
a first action identifier identifying a first action relating to said first data transport service, said first action being executed on receipt of said third message by the recipient device using said first data set identified by said first data set identifier,
communication means for controlling the setting up of said communication link by sending to said recipient device a fourth message after sending the at least one second message, the fourth message comprising:
said first protocol identifier identifying said first data transmission protocol,
said second data set identifier, and
a second action identifier identifying a second action relating to said first data transmission protocol, said second action being executed on receipt of said fourth message by the recipient device using said second data set identified by said second data set identifier.

10. A receiving device controlled by a sending device for a set up of a machine-to-machine communication link to be established by a recipient device and accessing a communication network, comprising:
communication means capable of receiving messages sent by the sending device, and
processing means capable of processing at least one first and at least one second message received separately from the sending device, the at least one second message being received after the receipt of the at least one first message,
the first message comprising:
a first service identifier identifying a first data transport service usable for setting up a communication link for transmitting data, and
a first data set identifier identifying a first data set,
said first data set comprising configuration data of said first data transport service, the second message comprising:
    a first protocol identifier identifying a first data transmission protocol usable for transmitting data through said communication link, and
    a second data set identifier identifying a second data set,
    said second data set comprising configuration data of said first data transmission protocol,
the receiving device further comprising:
    processing means capable of processing a third message after processing the first message and processing a fourth message after processing the second message,
    the third message comprising:
        said first service identifier identifying said first data transport service,
        said first data set identifier, and
        a first action identifier identifying a first action relating to said first data transport service,
    the fourth message comprising:
        said first protocol identifier identifying said first data transmission protocol,
        said second data set identifier, and
        a second action identifier identifying a second action relating to said first data transmission protocol,
the receiving device being configured to:
    open a connection for transmitting data based on the first service identifier,
    configure said connection using said first data set previously received in said first message together with said first service identifier,
    verify the compatibility between the data transmission protocol identified by the first protocol identifier and the data transport service identified by the first service identifier,
    if the first protocol identifier and the first service identifier are compatible, execute the second action.

11. A method for setting up a machine-to-machine communication link by a receiving device, said method comprising:
    receiving, separately from a sending device, a first message and, after receiving the first message, a second message,
    processing said first and said second message,
the first message comprising:
    a first service identifier relating to a first data transport service usable for setting up a communication link for transmitting data, and
    a first data set identifier identifying a first data set,
    said first data set comprising data transport service configuration data of said first data transport service,
the second message comprising:
    a first protocol identifier identifying a first data transmission protocol usable for transmitting said data through said communication link,
    a second data set identifier identifying a second data set, and
    said second data set comprising data transmission protocol configuration data of said first data transmission protocol,
processing a third message received from said sending device after processing the first message, said third message comprising:
    said first service identifier identifying said first data transport service,
    said first data set identifier,
    a first action identifier identifying a first action relating to said first data transport service,
setting up said communication link and executing said first action using said first data set previously received in said first message together with said first service identifier,
processing a fourth message received from said sending device after processing the second message, said fourth message comprising:
    said first protocol identifier identifying said first data transmission protocol,
    said second data set identifier, and
    a second action identifier identifying a second action relating to said first data transmission protocol,
configuring said communication link using said first data set previously received in said first message together with said first service identifier,
verifying the compatibility between the data transmission protocol identified by the first protocol identifier and the data transport service identified by the first service identifier,
if the first protocol identifier and the first service identifier are compatible, executing the second action.

\* \* \* \* \*